United States Patent
van Bree et al.

(10) Patent No.: US 8,541,753 B2
(45) Date of Patent: Sep. 24, 2013

(54) MEASUREMENT APPARATUS AND METHOD FOR DETECTING CONTAMINATION ON A MOVING OBJECT

(75) Inventors: Daan van Bree, Meppel (NL); Ingo Koelln, Hamburg (DE)

(73) Assignee: Mirion Technologies (RADOS) GmbH, Hamburg (DE)

( * ) Notice: Subject to any disclaimer, the term of this patent is extended or adjusted under 35 U.S.C. 154(b) by 254 days.

(21) Appl. No.: 12/881,770

(22) Filed: Sep. 14, 2010

(65) Prior Publication Data

US 2011/0215253 A1    Sep. 8, 2011

(30) Foreign Application Priority Data

Sep. 15, 2009   (DE) .......................... 10 2009 042 054

(51) Int. Cl.
*G01J 1/42* (2006.01)
(52) U.S. Cl.
USPC ........................................................ 250/394
(58) Field of Classification Search
USPC ........................................................ 250/394
See application file for complete search history.

(56) References Cited

U.S. PATENT DOCUMENTS

| 5,541,415 | A * | 7/1996 | Shonka | 250/374 |
| 6,603,125 | B1 * | 8/2003 | Cooke et al. | 250/369 |
| 2006/0284094 | A1 * | 12/2006 | Inbar | 250/359.1 |
| 2007/0018807 | A1 * | 1/2007 | Craig et al. | 340/500 |

* cited by examiner

*Primary Examiner* — David Porta
*Assistant Examiner* — Hugh H Maupin
(74) *Attorney, Agent, or Firm* — Vidas, Arrett & Steinkraus, P.A.

(57) ABSTRACT

A method for detecting contamination on a moving object moving in a longitudinal direction past a plurality of detectors, wherein
 a count rate is captured repeatedly by each of the detectors during the movement of the object past the detectors,
 the captured count rates are weighted in that the count rates of the detector(s) that have a greater separation distance from the object to be measures are weighted lower than the count rates of the detector(s) that have a smaller separation distance from the object to be measured.

13 Claims, 2 Drawing Sheets

MEASUREMENT APPARATUS AND METHOD FOR DETECTING CONTAMINATION ON A MOVING OBJECT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for detecting contamination on a moving object moving in a longitudinal direction past a plurality of detectors. The invention also relates to a measurement apparatus for detecting radioactive contamination of an object, which can move in a longitudinal direction through the measurement apparatus.

It is customary to perform inspections for the transport of radioactive sources at the entrances and exits of nuclear facilities, but also at border crossings, airports, or in general, at entrances and exits of buildings or regions. The inspections performed serve, on the one hand, for protecting people and on the other hand, can also uncover the illegal transport of radioactive material. These two aspects for detecting contamination are combined in the following when speaking of objects to be detected or inspected. Typically the objects to be inspected, which can be people, freight and/or vehicles, are led through a so-called portal monitor, in which detectors for gamma radiation and/or gamma and neutron radiation are provided transverse to the direction of movement.

In the case of a steady flow of objects to be inspected, the portal monitor used can become a chokepoint at which a bottleneck forms. In the case of inspecting people at entrances and exits, wait times arise. Also with container inspections, for example, at ports, the wait time can result in a slow-down in the processing of containers. The required measurement time for an object in a portal monitor depends directly on the required detection limit of the monitor. In the case of a low detection limit, a sensitive monitor can handle a higher flow-through of objects per unit of time, wherein the use of sensitive monitors is naturally associated with higher costs.

BRIEF SUMMARY OF THE INVENTION

An object of the invention is to provide a method as well as a measurement apparatus for detecting contamination on a moving object, which lower the detection limit with the simplest means possible and permit exact measurement.

In the case of the method according to the invention for detecting contamination on a moving object, the object to be measured moves in the longitudinal direction past a plurality of detectors. According to the invention, a count rate is captured repeatedly by each of the detectors during the movement of the object past the detectors. The captured count rates are weighted. During the weighting, the count rates of the detector(s) that have a greater separation distance from the object to be measured are weighted lower than the count rates of the detector(s) that have a smaller separation distance. The weighting hereby refers to a count rate captured by a detector at a point in time to the separation distance of the object from the detector at the point in time when the count rate was captured. During the movement of the object, the count rates of the individual detectors are captured through the repeated capturing of the count rates at several points in time. A weighting of the count rates takes place before an evaluation of the count rates, which can be performed with conventional statistical methods. During this weighting, count rates of those detectors that are located far away from the object for the capturing of the count rate are weighted weaker than the count rates of detectors that are located closer to the object at the point in time of the capturing of the count rate. The weighting of the count rates reduces the background count rate of the detectors that are not located near the object and the detection limit of the entire measurement apparatus is thus considerably reduced. It is important in the invention that the sensitivity or the resolution of the used detectors must not be changed, but rather that the detection limit can be considerably reduced only through weighting of the temporally consecutively captured count rates at a plurality of detectors. According to the invention, a considerably better detection limit of the measurement apparatus can be achieved with the same detector volume and with the same detector design.

In a preferred embodiment of the invention, the position of the object is determined from the temporal progression of a maximum of the count rates of the detectors. If count rates that lie above the background count rate occur at the individual detectors, then this increased count rate wanders past detectors together with the movement of the object. Depending on the temporal resolution with which the count rates are captured, it can also be determined by the count rates of a detector that the count rate increases as the object approaches and decreases again as the object retreats. In that this maximum is tracked, the movement of the object past the detectors can be reconstructed in order to thus determine the position of the object with respect to the individually captured count rates.

Alternatively and/or additionally, it is possible to provide a position capturing device that captures the position of the moving object and makes it the basis of the weighting of the individual count rates. The position capturing device can have for example optical aids and/or electrical contacts, but also photo sensors and other suitable means.

In a preferred embodiment of the invention, the count rates of the detector that is located closest to the object are weighted the strongest and the count rates of the adjacent detectors with the same factor are weighted weaker. It is hereby understood that the weighted count rates must be standardized before an evaluation of the count rate so that the weighting does not change the evaluation with respect to predetermined threshold values or other absolutely set variables.

In a preferred embodiment, the detectors that lie further than one detector away from the object are weighted with a weight of zero. This means that at most three detectors can be evaluated simultaneously in the measurement apparatus. In the phases, in which the object enters or leaves the measurement apparatus, only one or two detectors can be evaluated.

In a preferred embodiment, the detectors weighted with a weight of zero are switched off so that no count rate can be captured on them.

In a preferred embodiment, the contamination is detected when one of the detectors has a count rate that lies above a certain threshold value. It is hereby guaranteed that contamination is detected for a radiation source moving past the detectors at an uneven speed when the radiation source lingers for a longer period in front of one of the detectors so that its count rate increases. Such a scenario can occur for example when a radiation source with a moving leg moves past the detectors comparatively quickly and only lingers with the standing leg for a sufficiently long period of time in front of one of the detectors in order to be captured.

The object according to the invention is also solved through a measurement apparatus for detecting radioactive contamination with the characteristics of claim 8. The object to be captured can move in a longitudinal direction through the measurement apparatus. According to the invention, the measurement apparatus has a plurality of detectors that are arranged behind each other in the longitudinal direction for the capturing of a radiation source moving through the measurement apparatus. Furthermore, an evaluation device that captures a count rate of each of the detectors during a movement of the object through the measurement apparatus is provided according to the invention. After the movement of the object through the measurement apparatus, the evaluation device has several captured count rates from each of the detectors. According to the invention, the measured count rates of the detectors are weighted by the evaluation device in that the count rates of the detector(s) that have a greater separation distance from the object to be measured are weighted lower than the count rate of the detector(s) that have a smaller separation distance from the object. In the measurement apparatus according to the invention, those detectors that are located further away from the object do not contribute to the background count rate so that a lower detection limit can be achieved for radioactive contamination.

The measurement apparatus is preferably equipped with a position capturing device, which captures the position of the object in the measurement apparatus and forwards it to the evaluation device. Based on the position, the evaluation device can determine the distance of the object for the currently captured count rate and can thus determine the provided weighting factor for this count rate.

The use of a separate position capturing device is in no way necessary, but rather it is possible to detect the position of the object from the temporal progression of the count rates at the individual detectors. The evaluation device hereby determines the position of the object from the temporally consecutively captured count rates on the detectors and can thus determine the weighting factor.

In a preferred further embodiment of the measurement apparatus according to the invention, the evaluation device can trigger a warning signal that indicates potential contamination for the case that the maximum occurring count rates of one of the detectors lies above a predetermined threshold value.

BRIEF DESCRIPTION OF THE SEVERAL VIEWS OF THE DRAWINGS

A preferred embodiment of the invention is explained in greater detail below. The drawings show in.

DETAILED DESCRIPTION OF THE INVENTION

Figure 1:
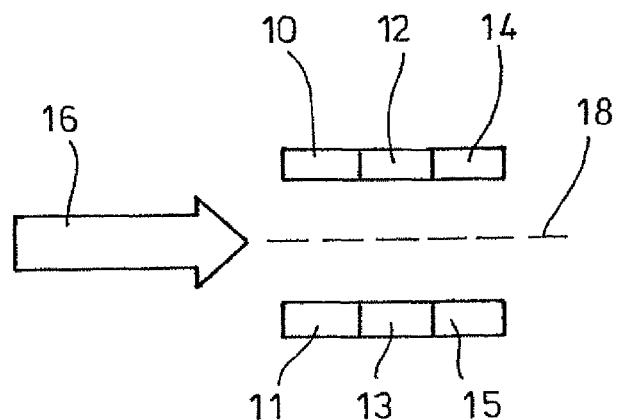
FIG. 1 a measurement apparatus with three detectors arranged behind each other.

While this invention may be embodied in many different forms, there are described in detail herein a specific preferred embodiment of the invention. This description is an exemplification of the principles of the invention and is not intended to limit the invention to the particular embodiment illustrated FIG. 1 shows a portal monitor for radioactive radiation, which has three pairs of detectors 10 through 15 arranged opposite each other. The detectors can be plastic scintillation detectors and neutron detectors fitted with $^3$He tubes. However, other detectors suitable for use of a portal monitor can generally be used. A direction of flow 16 is provided for the detector pairs 10/11, 12/13 and 14/15. In the examples shown, it is assumed that the direction of flow is oriented from left to right with respect to the figures so that the object to be measured first passes by detectors 10/11 and then detector pairs 12/13 and 14/15. The term direction of flow here is in no way restricted in that objects flow through the portal monitor, but they can rather also refer to people who move in the direction of flow 16 through the portal monitor. The direction of flow 16 runs along the longitudinal direction 18 of the portal monitor.

Figure 2:
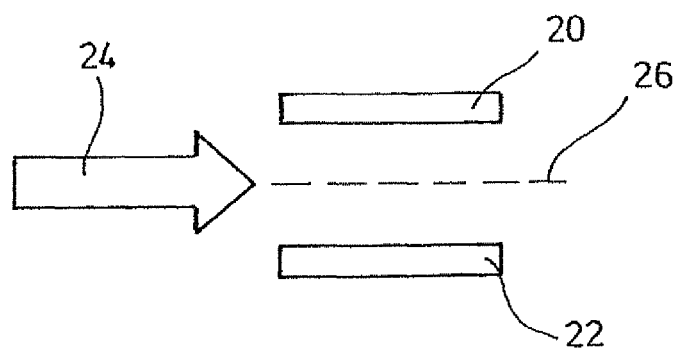
FIG. 2 a conventional measurement apparatus with a detector.

FIG. 2 shows a conventional portal monitor in a schematic view. This portal monitor has two opposing detectors 20 and 22, which determine a count rate for an object moving in the direction of flow 24 of the longitudinal direction 26. Below, the transit time of the object through the portal monitor is $t_B$. In order to enable a better comparison of the portal monitors from FIG. 1 and FIG. 2, the transit time of both portal monitors is the same and may have the same length in longitudinal direction 18 or respectively 26.

Each of the detectors, even detectors 20, 22 or detectors 10-15, captures a background count rate, which also occurs when there is no radioactive sample at the detector. Naturally, each of the named detectors can have several measurement channels, wherein the background count rate per measurement channel should then be taken into consideration. During the actual measurement process, each detector captures a gross count rate for each of its measurement channels, which is made up of the background count rate and the net count rate caused by the object to be measured. The background count rate can be captured or predetermined for example before using the portal monitor.

In the case of the measurement apparatus according to FIG. 2, there is a count rate that states the detected contamination after the transit time $t_B$. Decisive for the use of the portal monitor is its detection limit, which is defined for example in ISO 11929-1. For simplicity's sake, it is assumed that the background measurement time is large compared to the transit time of the object. The detection limit NWG for the following expression then results:

$$NWG \alpha \frac{\sqrt{r_o}}{t_b \eta}$$

wherein $r_0$ is the base count rate [1/s], $t_B$ is the transit time [s] and $\eta$ is the degree of efficiency of a detector with respect to a defined radioactive source [Bq/s]. It is clear from the formula that the detection limit increases with an increasing background count rate in order to achieve the set detection limit; thus, the total measurement time should be extended with an increasing background count rate in order to achieve the desired detection limit.

Figure 3:
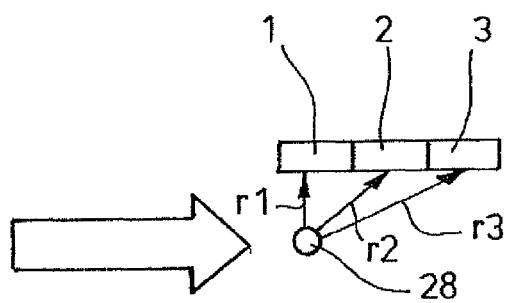
FIG. 3 the movement of an object past the detectors, wherein the object is located in front of the first detector, FIG. 4 the movement of an object past the detectors, wherein the object is located in front of the second detector, FIG. 5 the movement of an object past the detectors, wherein the object is located in front of the third detector, and FIG. 6 the progression of the count rates for three detectors arranged behind each other compared to a conventional portal monitor of the same length.
Figure 4:
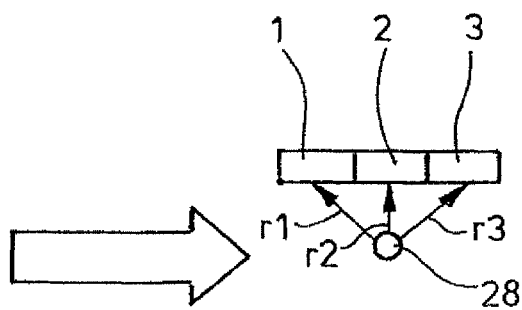
Figure 5:
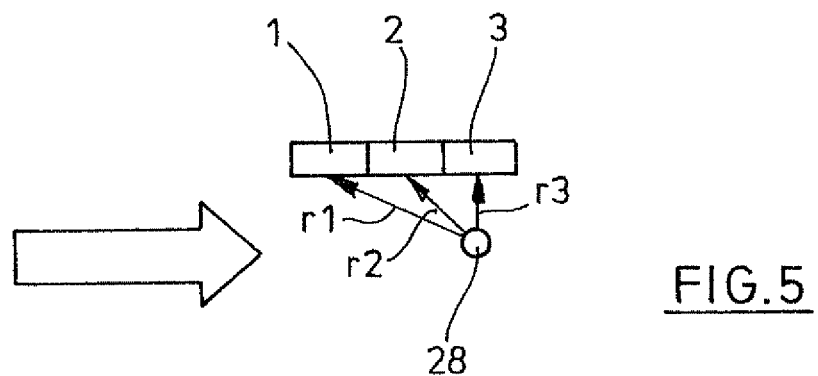

In the measurement apparatus according to the invention, the object 28 to be measured moves past the detectors. FIGS. 3 through 5 show the movement of an object 28 past the detectors. For a better overview, the detectors are only shown on one side of the portal monitor and are labelled with reference numbers 1, 2 and 3. During time interval $t_1$, the situation shown in FIG. 3 is present, in which the object 28 is located at separation distance r1 in front of detector 1 and has separation distance r2 from detector 2 and separation distance r3 from detector 3. During time interval t2, the object is located directly in front of detector 2 with separation distance r2 and has separation distance r1 or respectively r3 from detectors 1 and 3. FIG. 5 shows the situation, in which the object 28 is located directly in detector 3 with separation distance r3 and has separation distances r1 and r2 from detectors 1 or respectively 2.

If one now takes into consideration that the degree of efficiency of the detector located further away from the object is less than the degree of efficiency of a detector directly in front of which the object is located, then the following table results:

|          | $\eta_1$ | $\eta_2$ | $\eta_3$ | Total |
|----------|----------|----------|----------|-------|
| t1       | 1        | 0.5      | 0        | 1.5   |
| t2       | 0.5      | 1        | 0.5      | 2     |
| t3       | 0        | 0.5      | 1        | 1.5   |
| T = t1 + t2 + t3 | 1.5 | 2     | 1.5      | 5     |

If one now assumes in order to compare the measurement apparatuses from FIG. 1 and FIG. 2 that the background count rate is 1 during the duration of a time interval, then the measurement arrangement from FIG. 2 results in a detection limit NWG of:

$$NWG_{integral} \approx (\sqrt{9}/3 * 5$$

wherein 9 is assumed for the background count rate, three time intervals are measured and detectors 20 and 22 are triple the length of detectors 10, 12 and 14. This results in a background count rate of 9. The total duration is 3 and the degree of efficiency of the arrangement is 5 for the total measurement duration, which results from the above table.

In the measurement apparatus according to the invention according to FIG. 1, the measurement of the third detector in time interval 1 and the measurement of the first detector in time interval T3 can be omitted from the calculation, since they did not contribute to the measurement with a degree of efficiency of zero. This results in a background count rate of 9−2=7 and the detection limit increases proportionally.

$$NWG_{trend} \approx (\sqrt{9-2})/3 * 5$$

If one compares both detection limits, then one can see that the detection limit in the case of the system according to the invention is approximately 12% lower than in the case of the conventional system. Thus, a considerable improvement in the detection limit in the same active detector volume can be achieved in that count rates of individual detectors are examined in a temporally triggered manner during the measurement.

In order to implement this improved detection limit of the measurement apparatus according to FIG. 1 in a method, the count rates occurring on the detectors during the measurement process are weighted. In terms of the above example, this means that during time interval t1 the count rate of detector 1 is captured with full weight and the count rate of detector 2 is weighted with a factor of ½. The count rate of detector 3, which mainly detects the background radiation, is not taken into consideration in time interval t1 and is rather weighted with a factor of 0. In FIG. 4, the count rates of detector 2 captured in time interval t2 have full weight while the count rates of detectors 1 and 3 are included in the evaluation measurement with a lower weight. In FIG. 5, the count rates are weighted similarly to FIG. 3, wherein the count rate of detector 1 has a weight of 0 and the count rate of detector 2 has a lower weight than the count rate of detector 3. In this manner, the count rate of detectors 1 and 3 in time intervals 3 or respectively 1 is completely suppressed during the movement of the object 28 through the measurement apparatus and the detection limit is thus improved.

The above method was explained using an example of three detectors arranged behind each other. It goes without saying that the method can also be performed with a greater number of detectors.

Figure 6:
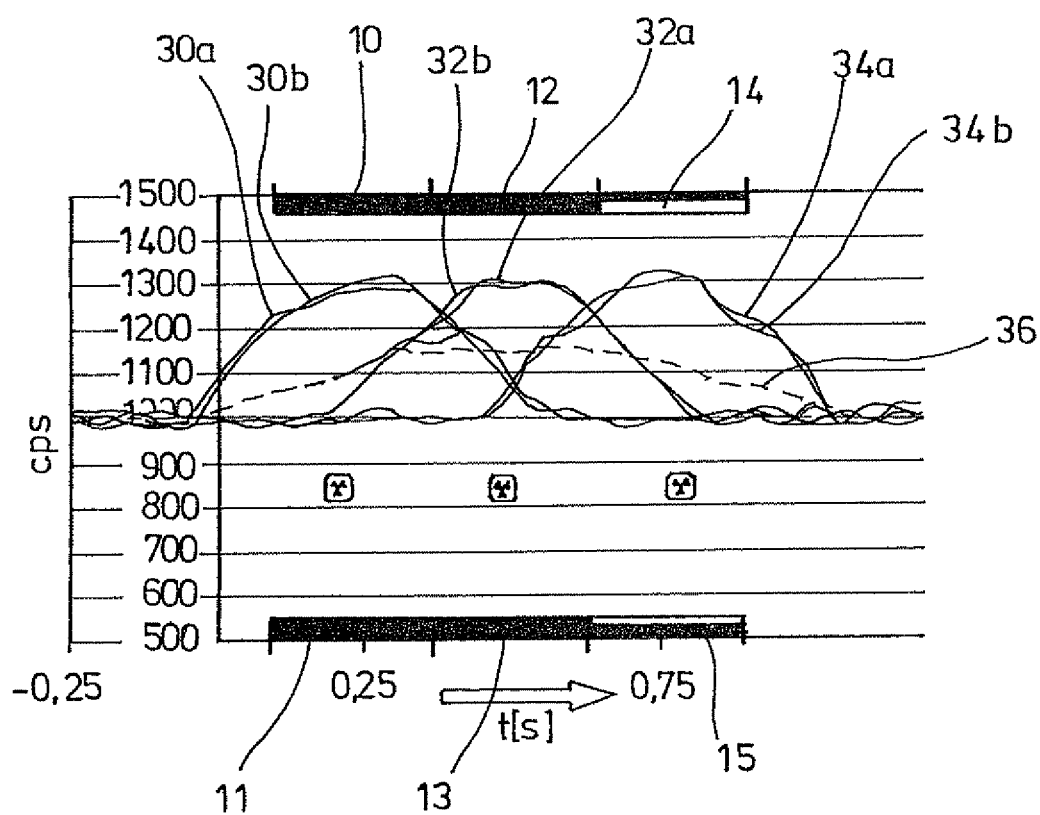

FIG. 6 shows an example of the progression of the count rates when the radioactive source passes by detectors 10 through 15. FIG. 6 shows the captured count rates (cps) applied over time (t). It is clear that the count rates 30A, 30B of detectors 10 and 11 first increase at the start of the passage. In the subsequent time interval, i.e. approximately at 0.3 seconds, the count rates 32A and 32B increase, while the count rates 30A and 30B already decrease again. In the next time interval, the count rates 34A and 34B of detectors 14 and 15 reach their maximum. It is clear that the count rates of detectors 14 and 15 only detect background radiation at the start of the measurement process with approximately 1000 cps. The dashed count rate line 36 corresponds with the count rate that would result if the count rates of detectors 10 through 15 were averaged. Count rate 36 thus shows what a conventional portal monitor would detect during the passage of this sample. It is clear that due to the spatial resolution of the detectors a considerably better sensitivity and thus a lower detection limit can be achieved.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for detecting contamination on a moving object comprising the following steps:
    moving said object in a longitudinal direction past a plurality of detectors,
    repeatedly capturing a count rate by each of the detectors during the movement of the object past the detectors,
    determining the position of the object from a temporal progression of a maximum of the count rates,
    weighting the captured count rates to obtain weighted count rates, wherein the count rates of the detectors having a greater separation distance from the object at the time of the measurement are weighted lower than the count rates of the detectors having a smaller separation distance from the object at the time of the measurement, and
    standardizing the weighted count rates before evaluation so that the weighting does not change the evaluation with respect to permitted threshold values or other absolutely set variables.

2. The method of claim 1, wherein the count rates of the detector that is located closest to the object are weighted the strongest and the count rates of adjacent detectors with the same factor are weighted weaker.

3. The method according to claim 2, wherein the detectors which lie more than one detector away from the object are weighted with a weight of zero.

4. A method for detecting contamination on a moving object moving in a longitudinal direction past a plurality of detectors,
    wherein a count rate is captured repeatedly by each of the detectors during the movement of the object past the detectors, the captured count rates are weighted in that the count rates of the detector(s) that have a greater separation distance from the object to be measured are weighted lower than the count rates of the detector(s) that have a smaller separation distance from the object to be measured, wherein the position of the object is determined from the temporal progression of a maximum of the count rate wherein the count rates of the detector that is located closest to the object are weighted the strongest and the count rates of adjacent detectors with the same factor are weighted weaker, wherein the detectors which lie more than one detector away from the object are weighted with a weight of zero, wherein the detectors that are weighted with a weight of zero are switched off.

5. The method according to claim 1, wherein contamination is detected when one of the detectors has a count rate that lies above a predetermined threshold value.

6. A method for detecting contamination on a moving object, comprising the following steps:

moving said object in a longitudinal direction past a plurality of detectors, repeatedly capturing a count rate by each of the detectors during the movement of the object past the detectors, capturing the position of the object with a position capturing device, arranging detectors one behind each other in a longitudinal direction, weighting the captured count rates to obtain weighted count rates, wherein the count rates of the detectors having a greater separation distance from the object at the time of the measurement are weighted lower than the count rates of the detectors having a smaller separation distance from the object at the time of measurement, and standardizing the weighted count rates before evaluation so that the weighting does not change the evaluation with respect to permitted threshold values or other absolutely set variables.

7. The method of claim 6, wherein the count rates of the detector that is located closest to the object are weighted the strongest and the count rates of adjacent detectors with the same factor are weighted weaker.

8. The method according to claim 6, wherein contamination is detected when one of the detectors has a count rate that lies above a predetermined threshold value.

9. A measurement apparatus for detecting radioactive contamination of an object, which can move in a longitudinal direction through the measurement apparatus, comprising:

a plurality of detectors, which are arranged in the longitudinal direction for detecting a radiation source moving through the measurement apparatus, an evaluation device, which captures repeatedly a count rate of each of the detectors during a movement of the object past the detectors and the evaluation device weights the measured count rates of the detectors in that the count rates of the detector(s) that have a greater separation distance from the object to be measured are weighted lower than the count rate of the detector(s) that have a smaller separation distance from the object, said evaluation device including standardized weighted count rates before the evaluation such that the weighting does not change an evaluation with respect to permitted threshold values or other absolutely set variables, wherein the evaluation device determines the position of the object from the temporal progression of a maximum of the count rates at the individual detectors.

10. The measurement apparatus according to claim 9, wherein a position capturing device is provided, which forwards the position of the object in the measurement apparatus to the evaluation device.

11. The measurement apparatus according to claim 10, wherein the evaluation device triggers a warning signal that indicates potential contamination for the case that the maximum occurring counting type of one of the detectors lies above a predetermined threshold value.

12. The measurement apparatus according to claim 9, wherein the evaluation device triggers a warning signal that indicates potential contamination for the case that the maximum occurring counting type of one of the detectors lies above a predetermined threshold value.

13. A measurement apparatus for detecting radioactive contamination of an object, which can move in a longitudinal direction through the measurement apparatus, comprising:

a plurality of detectors, which are arranged in the longitudinal direction for detecting a radiation source moving through the measurement apparatus, an evaluation device, which captures repeatedly a count rate of each of the detectors during a movement of the object past the detectors and the evaluation device weights the measured count rates of the detectors in that the count rates of the detector(s) that have a greater separation distance from the object to be measured are weighted lower than the count rate of the detector(s) that have a smaller separation distance from the object, said evaluation device including standardized weighted count rates before the evaluation such that the weighting does not change an evaluation with respect to permitted threshold values or other absolutely set variables, wherein a position capturing device is provided, which forwards the position of the object in the measurement apparatus to the evaluation device.

* * * * *